United States Patent
Kawamoto (10) Patent No.: US 6,763,159 B2
(45) Date of Patent: Jul. 13, 2004

(54) WAVEGUIDE TYPE LIQUID CRYSTAL OPTICAL SWITCH

(75) Inventor: Shinji Kawamoto, Osaka (JP)

(73) Assignee: Nippon Sheet Glass, Co. Ltd., Osaka (JP)

(*) Notice: Subject to any disclaimer, the term of this patent is extended or adjusted under 35 U.S.C. 154(b) by 0 days.

(21) Appl. No.: 10/438,877

(22) Filed: May 16, 2003

(65) Prior Publication Data

US 2003/0219197 A1 Nov. 27, 2003

(30) Foreign Application Priority Data

May 17, 2002 (JP) .................................. P2002-143335

(51) Int. Cl.[7] .............................................. G02B 6/26
(52) U.S. Cl. ............................. 385/16; 385/16; 385/40; 385/129; 385/130; 385/131; 385/132
(58) Field of Search .............................. 385/15, 16, 17, 385/18, 14, 40, 41, 129, 130, 131, 132

(56) References Cited

U.S. PATENT DOCUMENTS

| | | | |
|---|---|---|---|
| 4,749,258 A | 6/1988 | Baker | 385/15 X |
| 5,044,712 A | 9/1991 | Soref | 385/14 X |
| 5,586,205 A * | 12/1996 | Chen et al. | 385/29 |
| 5,596,671 A * | 1/1997 | Rockwell, III | 385/147 |
| 6,546,163 B2 * | 4/2003 | Thackara | 385/18 |
| 2002/0041726 A1 * | 4/2002 | Thackara | 385/16 |
| 2003/0156793 A1 * | 8/2003 | Kawamoto et al. | 385/41 |

FOREIGN PATENT DOCUMENTS

| | | | |
|---|---|---|---|
| EP | 0 317 531 | 5/1989 | 385/15 X |
| EP | 1 054 288 A2 | 11/2000 | 385/15 X |
| JP | 05-165068 | 6/1993 | 385/15 X |

OTHER PUBLICATIONS

European Search Report dated Aug. 1, 2003.

* cited by examiner

*Primary Examiner*—Brian M. Healy
(74) *Attorney, Agent, or Firm*—Whitham, Curtis & Christofferson, P.C.

(57) ABSTRACT

The invention provides a waveguide type liquid crystal optical switch that includes first and second cores so as to form a space therebetween, in which an optical path is switched between the first and second cores; a third core provided apart from the first and second cores, into which nematic liquid crystal orientated by an orientation film along a predetermined direction is filled, the third core overlapping to the space formed between the first and second cores; a first electrode arranged on an opposite side of the first and second cores with respect to the third core so as to overlap to the space between the first and second cores, second and third electrodes arranged on both sides of the first electrode, for orienting liquid crystal molecules along a direction perpendicular to the orientation direction of the orientation film; and a cladding for incorporating the cores and the electrodes.

8 Claims, 7 Drawing Sheets

WAVEGUIDE TYPE LIQUID CRYSTAL OPTICAL SWITCH

The present application is based on Japanese Patent Application No. 2002-143335, the entire contents of which are incorporated herein by reference.

BACKGROUND OF THE INVENTION

1. Field of the Invention

The present invention is related to an optical switch employed in, for instance, optical communication systems. More specifically, the present invention is directed to a waveguide type liquid crystal optical switch for controlling switching operations of optical paths between waveguides by way of liquid crystal.

2. Related Art

Since large amounts of information can be transmitted/received in optical communications, very recently, these optical communications are gradually popularized in many homes. These optical communications correspond to transmission systems by employing optical fibers. In order to distribute optical signals to respective terminals of such transmission systems, various sorts of optical components known as fiber type optical couplers, optical wavelength division multiplexers/demultiplexers optical wave guide type branching/combining devices, and optical switches have been developed.

Among these optical components, optical switches may have switching functions of optical paths, and thus, may become important as switching devices for optical communications. Conventionally, various sorts of optical switches utilized in optical communications are known in this technical field. Among these optical switches, since such an optical switching system that while optical waveguides are used, optical transmission paths are switched by utilizing various sorts of physical phenomena is not equipped with any mechanical movable portion, this optical switching system has merits of high reliability and highspeed operations. As such an optical switching system, for instance, various optical switches are known. That is, there are optical switches using dielectric crystal waveguides such as LiNbO$_3$ having either the electrooptic effect or the acostooptic effect; optical switches using semiconductor waveguides, while carrier injection is utilized; and optical switches using silica-system waveguides, while the thermooptic effect is utilized.

Also, among optical switches equipped with similar optical waveguides, optical switches using liquid crystal are known. Liquid crystal may have the electrooptic effect under which refractive indexes are changed by applying electric field to the liquid crystal, in view of abroad sense Also, liquid crystal may have various characteristics, namely, liquid crystal may be driven under low voltages, may have high reliability (actually realized as display devices), may have high productivity, and may be manufactured in low cost. As such optical wavelength type liquid crystal switches, for example, Japanese Unexamined Patent Publication No. H05-165068A describes such a waveguide type liquid crystal optical switch constituted in such a manner that two parallel single-mode optical core patterns are formed on the lower cladding and are equipped with the coupling portions, the partial portions of which are located in close proximity to each other; and furthermore, the lower electrode is formed on the lower cladding of the coupling portions, the coupling portions are filled with the orientated liquid crystal; and the coupling portions are sealed by the glass plate having the upper electrode.

However, in this waveguide type liquid crystal optical switch, since both the liquid crystal and the electrodes are formed in such a manner that the substantially entire portion of the lower cladding is covered, the refractive indexes are changed over the wide range of the lower cladding, so that the guided mode may be disturbed, and large crosstalks happen to occur. Such large crosstalks may cause a fatal defect with respect to optical switches. Moreover, since the three planes of the coupling portion of the waveguide core are made in contact to the liquid crystal, if there are such liquid crystal molecules which are not orientated along the predetermined direction, then the scattering loss caused by these not-orientated liquid crystal molecules is accordingly increased. Also, the lower electrode is located very close to the coupling portion of the waveguide, so that the loss caused by this lower electrode becomes very large. In addition, since this waveguide type liquid crystal optical switch has such a construction that only one pair of upper/lower electrodes are limitedly arranged, this optical switch has another problem that the polarized-wave dependent characteristics thereof are strongly emphasized.

SUMMARY OF THE INVENTION

The present invention has been made to solve these problems of the conventional optical switch, and therefore, has an object to provide a waveguide type liquid crystal optical switch capable of improving crosstalk performance and insertion loss and further having no polarized-wave dependent characteristic in addition to tho merits specific to such a waveguide type liquid crystal optical switch, namely, low cost, high reliability, and low power consumption.

To achieve the above-described object, a waveguide type liquid crystal optical switch, according to the present invention, is featured by that in an optical switch equipped with an optical waveguide having one pair of a first core and a second core located in proximity to the first core, for entering light into any one of the first core and the second core and for switching an optical path of the entered light between both the first core and the second core, such a waveguide type liquid crystal optical switch is comprised of: a third core provided apart from both the first core and the second core in such a manner that the third core covers a space sandwiched by both the first core and the second core, into which nematic liquid crystal orientated by an orientation film along a predetermined direction is filled; a first electrode of the third core, arranged on the opposite side with respect to both the first core and the second core in such a manner that a gap portion between the first core and the second core is covered by the first electrode; a second electrode and a third electrode, which are arranged to constitute a pair by sandwiching the first electrode, and cause liquid crystal molecules to be orientated along a direction perpendicular to the orientation direction of the orientation film; and a cladding for incorporating the first core, the second core, the third core, and the first to third electrodes.

BRIEF DESCRIPTION OF THE DRAWINGS

FIG. 3A shows OFF state, and FIG. 3B shows ON state;

FIGS. 5A and 5B are graphic representation for representing results of measuring changes in light intensity within the cores, FIG. 5A shows that of A-mode coupling, and FIG. 5B shows that of B-mode coupling;

DETAILED DESCRIPTION OF THE PREFERRED EMBODIMENTS

Referring now to drawings, a waveguide type liquid crystal optical switch according to the present invention will be described in detail.

(Waveguide Type Liquid Crystal Optical Switch)

Figure 1:
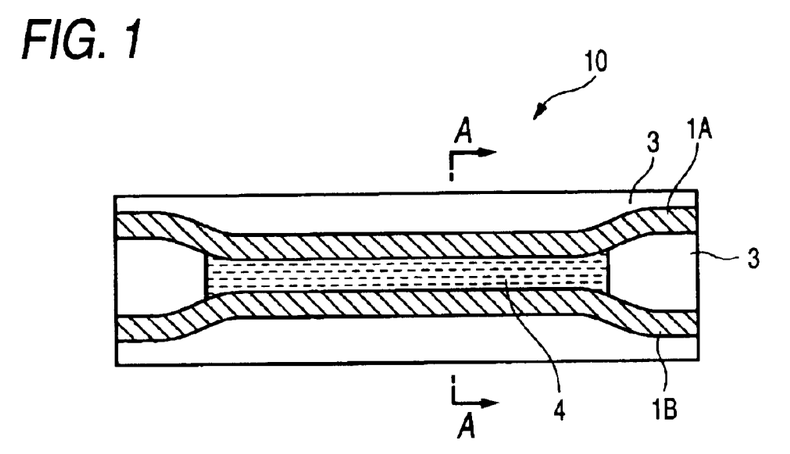
FIG. 1 is a plan view for indicating a waveguide type liquid crystal optical switch according to an embodiment of the present invention.
Figure 2:
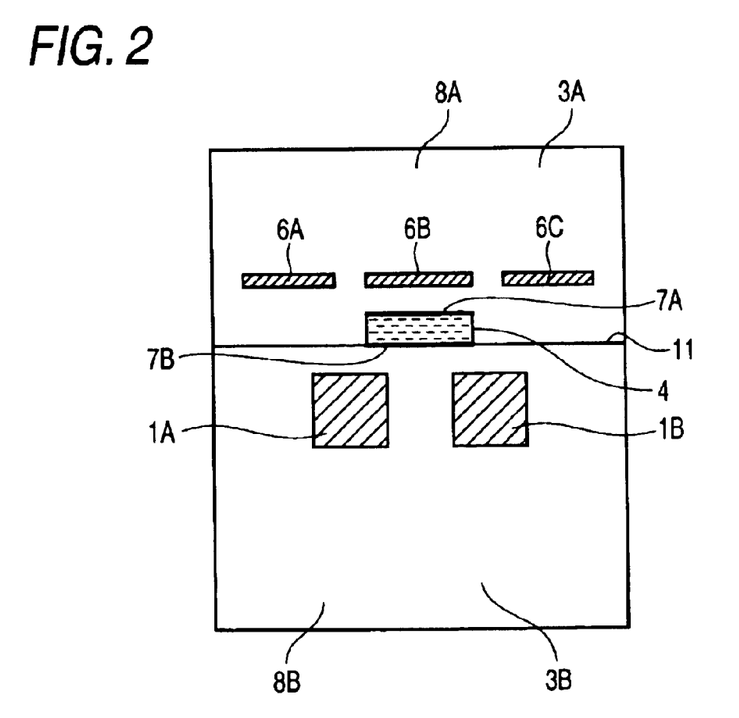
FIG. 2 is a sectional view of the waveguide type liquid crystal optical switch, taken along a line A—A of FIG. 1.

FIG. 1 is a plan view for indicating a waveguide type liquid crystal optical switch 10 according to an embodiment of the present invention, as viewed from a core side thereof (namely, lower side of FIG. 2). FIG. 2 is a sectional view of this waveguide type liquid crystal optical switch 10, taken along a line A—A of FIG. 1. As indicated in the drawings, the waveguide type liquid crystal optical switch 10 is subdivided into two substrates, namely, an upper substrate 8A and a lower substrate 8B. Both a first core 1A and a second core 1B are embedded at a predetermined depth position in this lower substrate 8B from a surface of the lower substrate 8B along an axial line direction of this lower substrate 8B. While the first core 1A is approached to the second core 1B at central portions thereof over predetermined lengths, both the first core 1A and the second core 1B are located in parallel to each other. Intervals between the first core 1A and the second core 1B are gradually widened toward edges of both end portions This approached parallel portion may form a so-called "optical directional coupler."

The upper substrate 8A and the lower substrate 8B are manufactured by such a material having a refractive index lower than that of a material used to manufacture the first core 1A and the second core 1B. This material of both the upper substrate 8A and the lower substrate 8B is selected to be, for example, a material of ($SiO_2$—$TiO_2$) having a refractive index of 1.523. On the other hand, the material of both the first core 1A and the second core 1B is selected to be, for instance, a material of ($SiCl_4$—$TiCl_4$) having a refractive index of 1.530.

A concave portion having a rectangular shape as viewed in a sectional plane is formed in a stripe form on a surface of the upper substrate 8A opposing the lower substrate 8B so that that this concave portion covers a space which is sandwiched by both the first core 1A and the second core 1B. An orientation film 7A is formed on a bottom portion of this concave portion, and nematic liquid crystal is filled on this orientation film 7A. While another orientation film 7B is provided on the lower substrate 8B in such a manner that an entire surface of this lower substrate 8B in covered by this orientation film 7B, the nematic liquid crystal is sealed by joining the upper substrate 8A to the lower substrate 8B by way of a properly-selected optical adhesive agent 11 to form an integral body, so that a third core 4 is formed.

It should be understood that there is no limitation as to the sort of nematic liquid crystal which constitutes the third core 4, and therefore, for example, 4-(4-pentylcyclohexyl) cyanobenzene and the like maybe used. Also, the materials of both the orientation film 7A and the orientation film 7B may be selected from any materials known in the technical field. For example, a polyamide film and the like, which have been rubbing-processed, may be used Also, a first electrode 6B is provided in the upper substrate 8A just above the third core 4 in such a manner that a gap between the first core 1A and the second core 1B is covered by this first electrode 6B. Furthermore, both a second electrode 6A and a third electrode 6C are formed on both sides of the first electrode 6B. The first electrode 6B, the second electrode 6A, and the third electrode 6C are controllable in an independent manner. Also, both the second electrode 6A and the third electrode 6C may define that the orientation direction of the liquid crystal molecules is intersected perpendicular to the orientation direction of the orientation films 7A and 7B. As the electrode material, metal materials such as gold, copper, and aluminum may be used in addition to transparent electric conductive materials such as $SnO_2$ and ITO or the like.

Figure 3A:
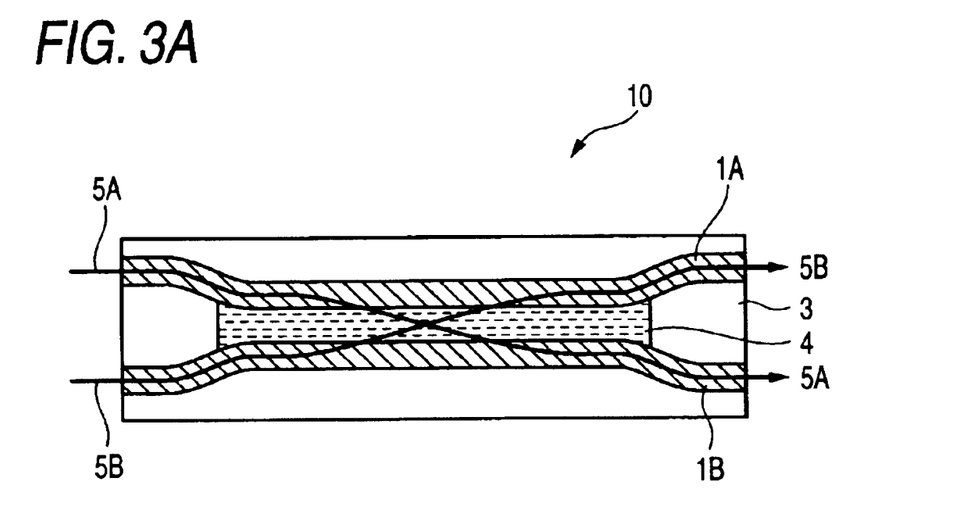
FIGS. 3A and 3B are plan views for indicating switching states of optical paths in the waveguide type liquid crystal optical switch shown in FIG. 1.
Figure 3B:
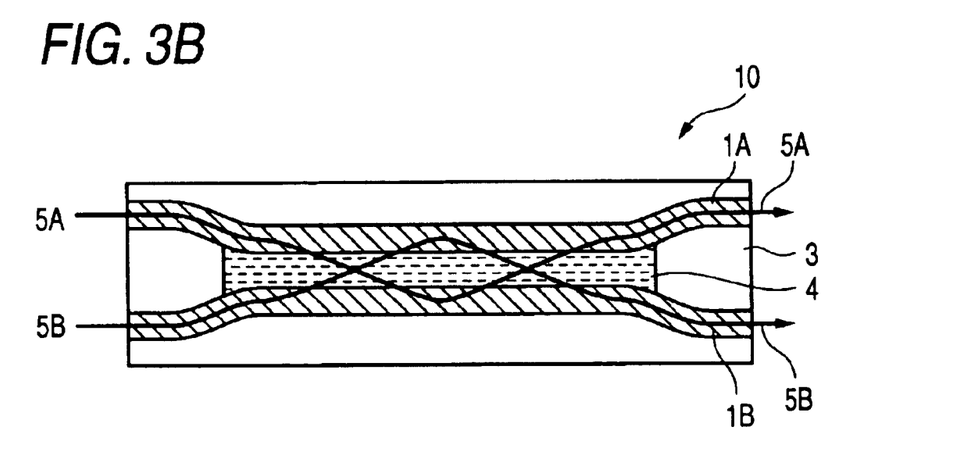

In the waveguide type liquid crystal optical switch 10 with employment of the above structure, the optical path can be switched (namely, switching operation) between the first core 1A and the second core 1B by adjusting voltages applied to the first to third electrodes 6A to 6C so as to control the orientation of the liquid crystal molecules of the third core 4. For example, as shown in FIG. 3A, an optical signal 5A and another optical signal 5B may be penetrated from respective cores provided on the light incident side to the third core 4, and may be furthermore transferred to other cores. Also, as represented in FIG. 3B, the optical signals which have been transferred to other cores may be again penetrated through the third core 4, and furthermore, may be transferred to the respective cores provided on the light incident side. In the below-mentioned descriptions, such a case that an entered optical signal is projected from the same core will be referred to as an "ON state (FIG. 3B)", whereas such a case that an entered optical signal is projected from another core will be referred to as an "OFF state (FIG. 3A)."

Figure 4A:
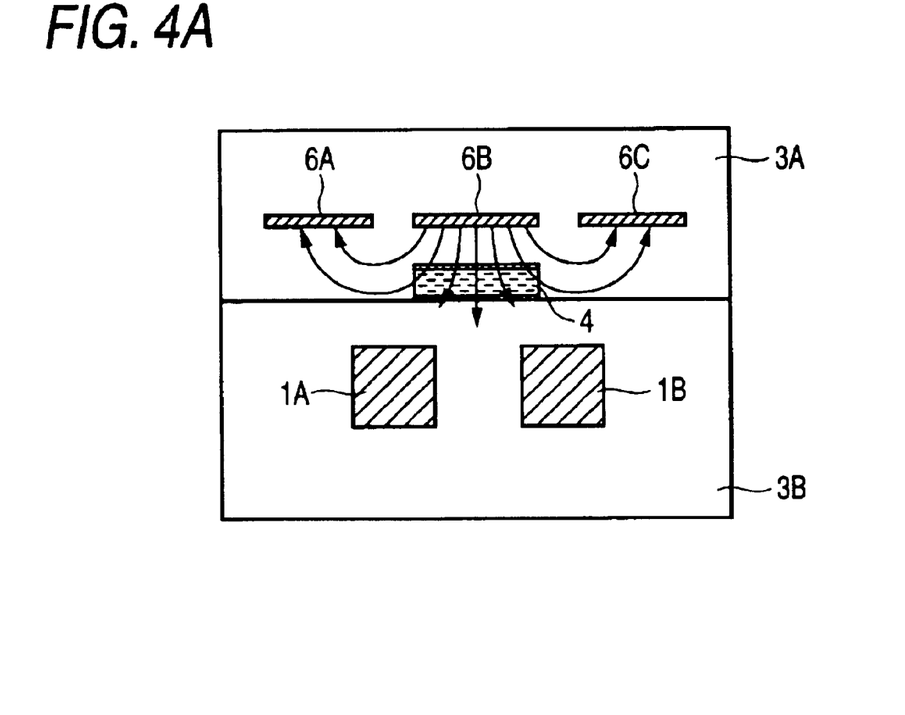
FIGS. 4A and 4B are sectional views for explaining a basic idea of optical path switching operations by the waveguide type liquid crystal optical switch shown in FIG. 1.
Figure 4B:
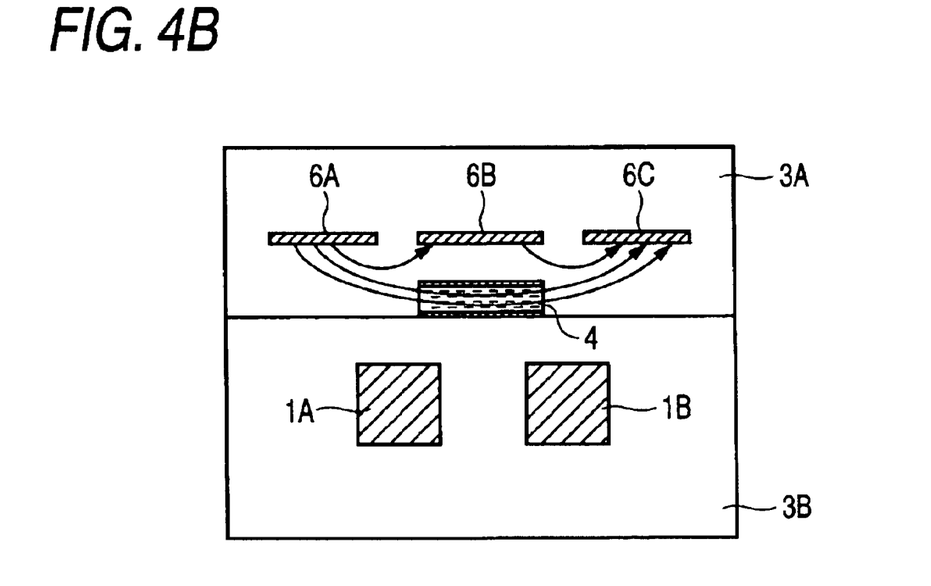

While the above-described optical path is switched, as indicated in FIG. 4A, since such potentials having the same phases are applied to both the second electrode 6A and the third electrode 6C with respect to the first electrode 6B, as indicated by arrows in FIG. 4A, such an electronic field is produced which is directed from the first electrode 6B to both the second electrode 6A and the third electrode 6C. As a consequence, in the third core 4, a vertical electric field with respect to the first electrode 6B may become dominant. As a result, a change in coupling coefficients with respect in FIG. 4B, since such potentials having the reverse phases are applied to both the second electrode 6A and the third electrode 6C while the first electrode 6B is set to the reference potential, as indicated by arrows in FIG. 4B, such a horizontal electric field becomes dominant, which is directed from the second electrode 6A to the third electrode 6C with respect to the third core 4. As a result, a change in coupling coefficients with respect to TM polarized light becomes dominant. As previously explained, since both the voltages and the phases applied to both the second electrode 6A and the third electrode 6C are adjusted with respect to the first electrode 6B, the ON states and the OFF states with respect to both the TE polarized light and the TM polarized light may be adjusted, and thus, there is no polarized-wave depending characteristic.

Generally speaking, since a change contained in refractive indexes of liquid crystal is several ten times larger than a difference contained in the refractive indexes between the material used to form the cores 1A and 1B, and the material used to form the cladding 3, the above-explained switching operation can be firmly carried out under low voltage.

It should also be noted that the above-described switching modes become reversed in the case that the nematic liquid crystal used in the third core 4 represents the positive change in the refractive indexes, and represents the negative change in the refractive indexes.

Also, in order to perform the above-explained switching operations in more correct manners, the operation mode of the waveguide type liquid crystal optical switch may he preferably set to either an A-mode coupling or B-mode coupling. Any one of these A-mode and B-mode couplings indicates such a case under the above-described ON state.

(1) A-mode Coupling

In this A-mode coupling, both the first core 1A and the second core 1B are set as follows: At respective intermediate positions of theme first and second cores 1A and 1B along optical axial directions thereof, both light intensity of the core into which light is entered within the first and second cores (for example, first core 1A), and light intensity of the third core 4 may become minimal values, and also, light intensity of the core into which the light is not entered within the first and second cores (for instance, second core 1B) may become a maximum value. In such a coupling mode, a portion of the light entered into the first core 1A is transferred via the third core 4 to the second core 1B, and thereafter, is similarly returned via the third core 4 to the first core 1A.

Figure 5A:
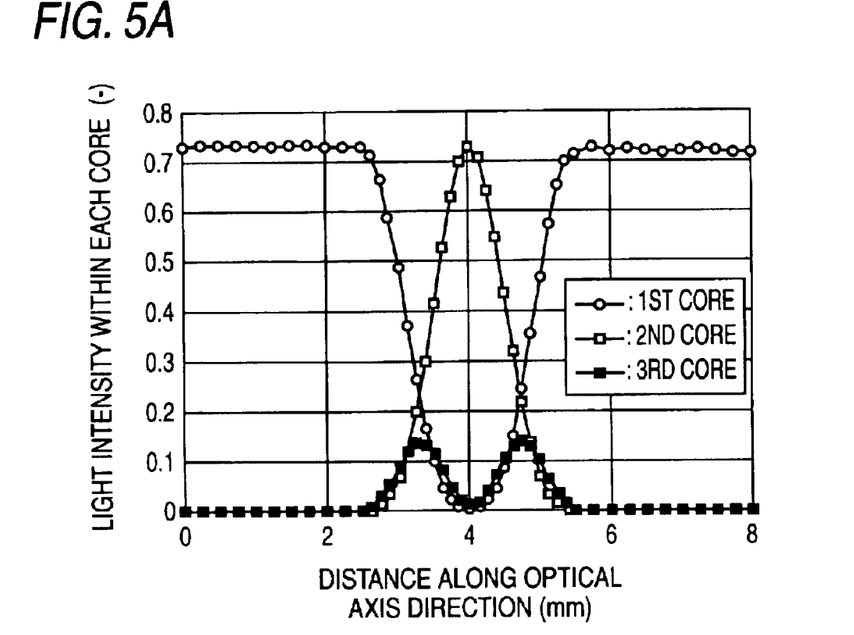
Figure 6A:
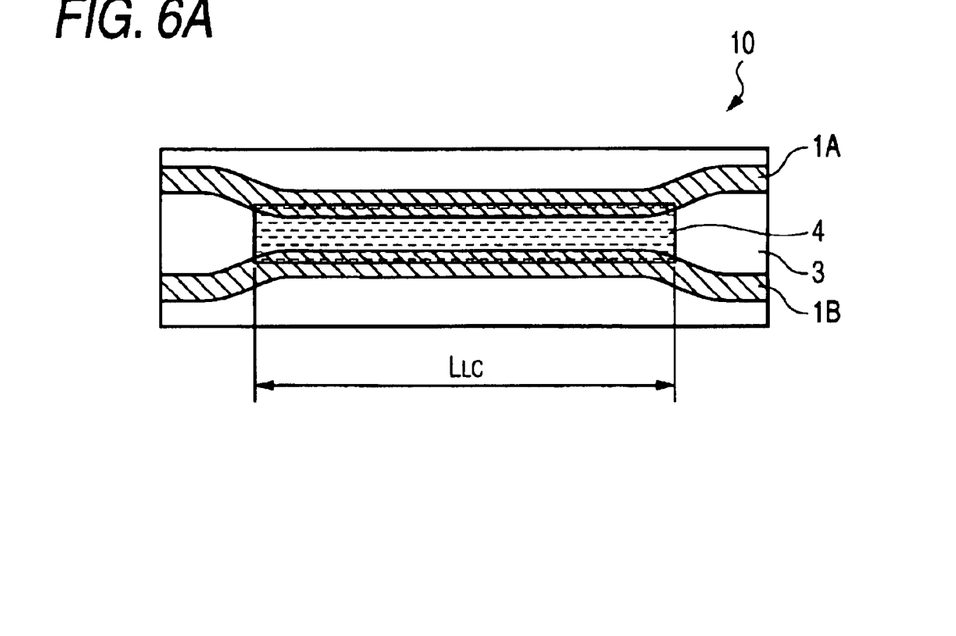
FIG. 6A is a plan view and FIG. 6B is a sectional view, which are used to explain design examples of the waveguide type liquid crystal optical switches in the A-mode coupling and the B-mode coupling.
Figure 6B:
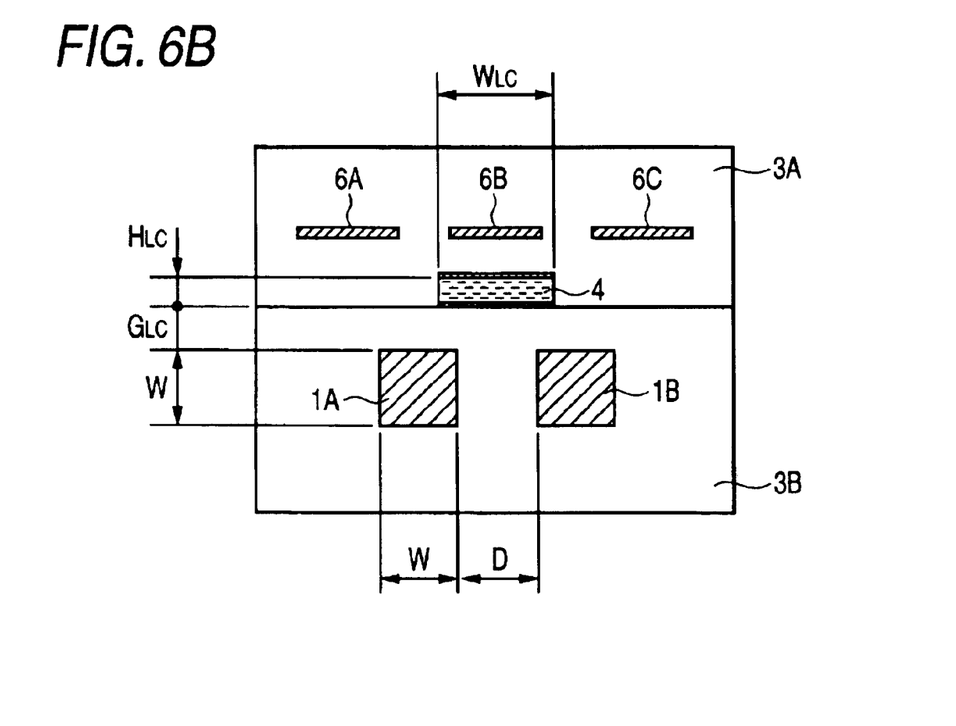

To realize this A-mode coupling, the respective cores must be designed in such a manner that a time period during which the incident light is transferred from the first core 1A to the second core 1B is made coincident with another time period during which the incident light is transferred via the third core 4 to either the first core 1A or the second core 1B. one example or this core designing idea is shown as follows: Also, FIG. 5A shows such a measurement result that while a waveguide type liquid crystal optical switch manufactured based upon the below-mentioned design ideas was employed, changes in light intensity of the respective cores were actually measured. It should also be noted that dimensional places are illustrated in FIGS. 6A and 6B. W=8 μm, D=5 μm, $G_{LC}$=1.5 μm, $H_{LC}$=1.6 μm, $W_{LC}$=8 μm, $L_{LC}$=2.97 μm.

(2) B-mode Coupling

Figure 5B:
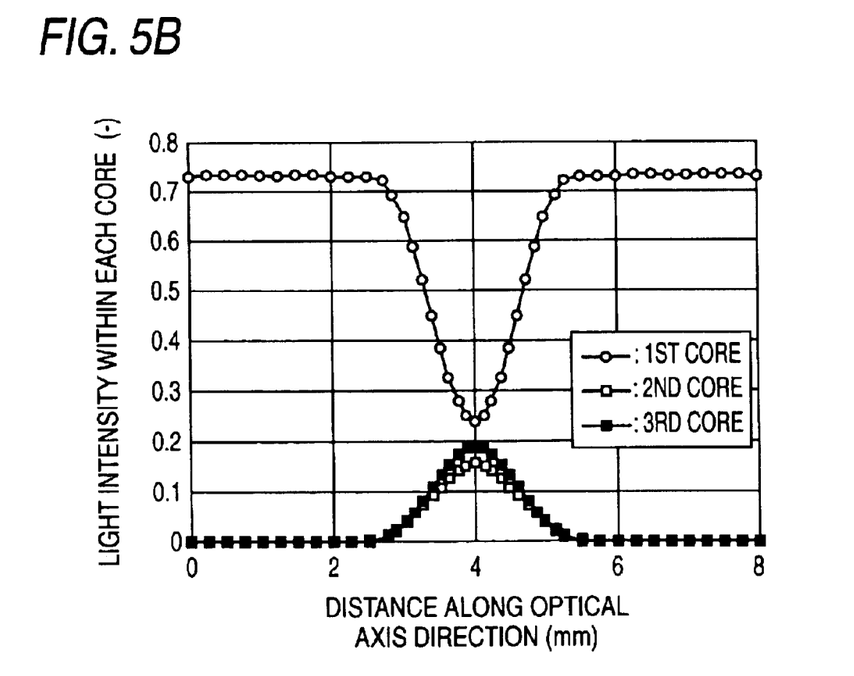

In this B-mode coupling, both the first core 1A and the second core 1B are set as follows: At respective intermediate positions of these first and second cores 1A and 1B along optical axial directions thereof, light intensity of the core into which light is entered within the first and second cores (for example, first core 1A) may become a minimal value, and also, both light intensity of the core into which the light is not entered within the first and second cores (for instance, second core 1B) and light intensity of the third core 4 may become maximum values. A designing example capable of realizing the B-mode coupling is shown in the below-mentioned description (dimensional places as illustrated In FIGS. 6A and 6B) This B-mode coupling has such a feature that both the first core 1A and the second core 1B are formed at such positions within the lower substrate 8B, which are located deeper than those of the A-mode coupling. Also, FIG. 5B shows such a result that while a waveguide type liquid crystal optical switch manufactured based upon the below-mentioned design ideas was employed, changes in light intensity of the respective cores were actually measured. W=8 μm, D=5 μm, $G_{LC}$=3.9 μm, $H_{LC}$=1.6 μm, $W_{LC}$=8 μm, $L_{LC}$=2.77 μm.

It should also be noted that in the waveguide type liquid crystal optical switch 10 of the present invention, as previously described, the metal in materials such as gold, copper, and aluminum are used as the electrode materials in addition to the transparent electric conductive materials such as $SnO_2$ and ITO. Since light absorptions may occur due to these materials, the first core 1A, the second core 1B, and the respective electrodes are preferably separated from each other by such a distance longer than, or equal to a half width (W) of each core, desirably substantially equal to this width (W). However, when the distance between the electrodes is increased, the voltage applied so as to orientate the liquid crystal molecules of the third core 4 must be increased in accordance with this increased distance, so that cost of electric power for switch operations is increased.

In order to solve such a difficulty, it is an effective way to suppress intensity of light distributed at outer sides of the respective electrodes. To this end, the refractive index or the cladding which surrounds both the first core 1A and the second core 1B, and the refractive indexes of the respective electrodes may be made different from each other. In other words, referring again back to FIG. 2, while the cladding 3 (see FIG. 1) may be defined as the lower substrate 8B which surrounds both the first core 1A and the second core 1B, and the upper substrate 8A which surrounds the first to third electrodes 6A to 6C and the third core 4, the lower substrate 8B and the upper substrate 8A are manufactured by employing separate materials having different diffractive indexes. For the sake of easy explanations, the upper substrate 8A will be referred to as an "upper cladding 3A", and the lower substrate 8B will be referred to as a "lower cladding 3B" in the below-mentioned explanations.

Figure 7A:
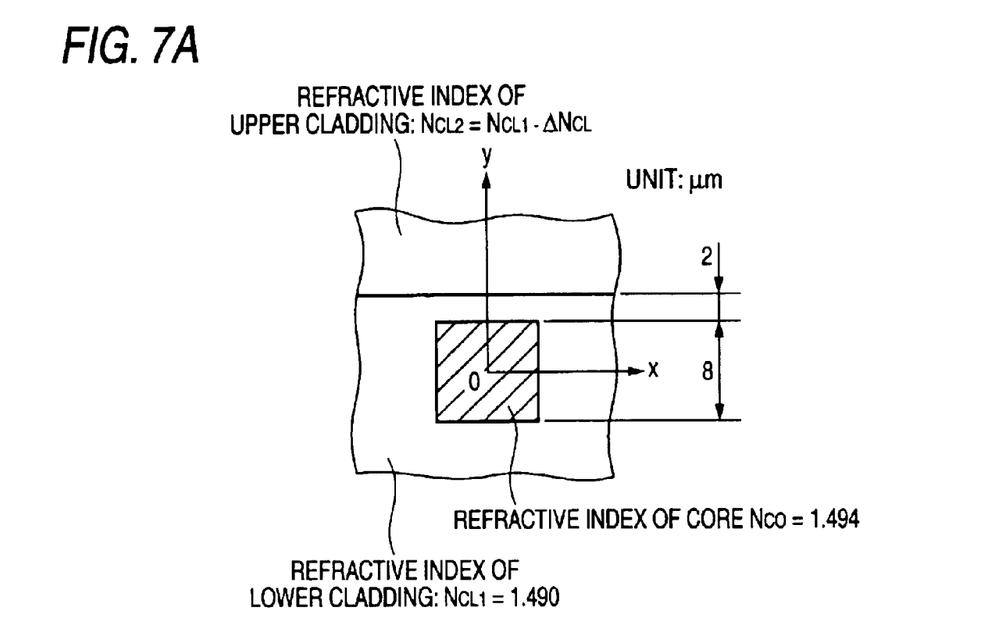
FIG. 7A is an illustration for representing a design example of a waveguide type liquid crystal optical switch employed so as to measure changes in light intensity within a core due to a refractive index difference between upper/lower claddings.
Figure 7B:
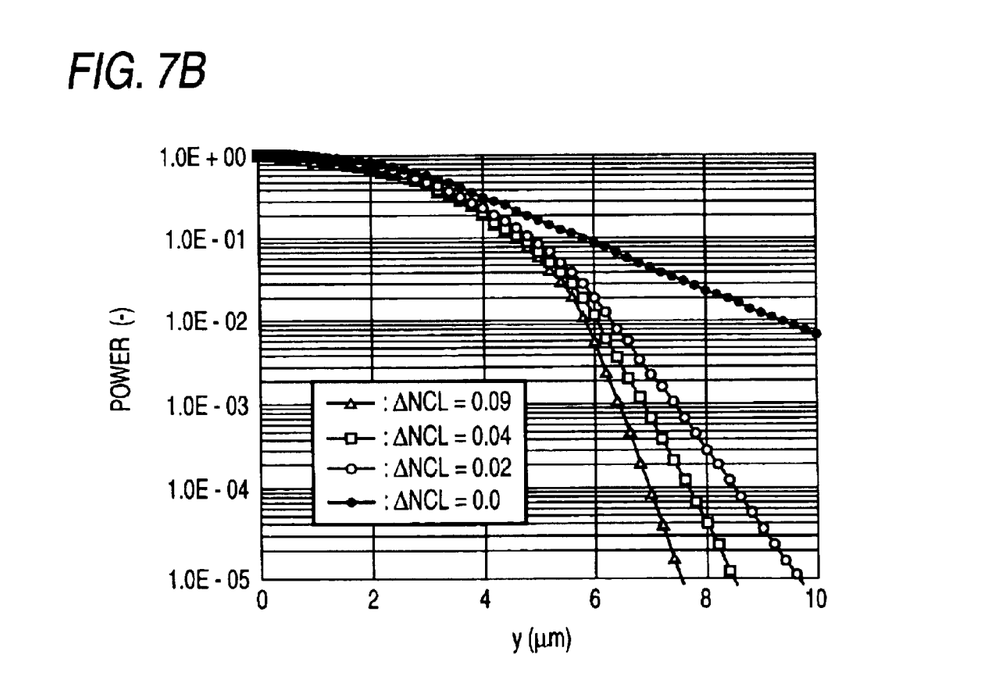
FIG. 7B is a graphic representation for indicating measurement results obtained by measuring both the refractive index difference between the upper/lower claddings, and the changes in the light intensity within the core.

In accordance with such a structure, assuming now that the refractive index of the lower cladding 3B is "$N_{CL1}$" and the refractive index of the upper cladding 3A is "$N_{CL2}$", in order that light is not leaked from the cores to the electrode sides (namely, upper/lower directions as viewed in this drawing), such a refractive index condition may be net to $(N_{CL1}-N_{CL2})>0$. The larger $(N_{CL1}-N_{CL2})$ is increased, the smaller the light is leaked. The cores and the upper/lower claddings 3A/3B were manufactured by employing the dimensions and the refractive index materials indicated in FIG. 7A, and attenuation amounts of light intensity along a y-axis direction were measured while $\Delta N_{CL}=N_{CL1}-N_{CL2}$ was employed as a parameter. This measurement result is indicated in FIG. 7B. If there is a refractive index difference ($\Delta N_{CL}$), as compared with such a case that $\Delta N_{CL}=0$, namely the refractive index of the upper cladding 3A is equal to the refractive index of the lower cladding 3B, then an attenuation of light intensity may appear. The larger the refractive index difference ($\Delta N_{CL}$) is increased, the larger the attenuation of light intensity is increased. In other words, it can be seen that the larger the refractive index difference ($\Delta N_{CL}$) is increased, the lower the light is leaked.

Based upon the above-described experimental result, for example, both the upper cladding 3A and the lower cladding 3B are formed by employing such a material having a refractive index difference ($\Delta N_{CL}$) of 0.04, whereas the respective electrodes 6A to 6C are formed on the upper cladding 3A while these electrodes 6A to 6C are separated by approximately 2 $\mu$m from the surface of the lower cladding 3B. Thus, the light intensity on the surfaces of the electrodes is attenuated lower than, or equal to 0.1% within the cores, so that light absorptions caused these electrodes can be substantially neglected.

Also, in general, since liquid crystal has large temperature dependent characteristics, the optical waveguide type liquid crystal optical switch 10 may be more preferably provided with a temperature control unit in order to eliminate an adverse influence caused by temperature changes in external environments. As the temperature control unit, a Peltier-effect element is suitable due to easy temperature controlling operation thereof. Although not shown in the drawing, for example, while this Peltier-effect element is provided in the vicinity of the third core 4 such as, e.g., an upper surface of the lower cladding 3B (otherwise, upper substrate 8A), the entire optical switch 10 is thermally insulated in addition thereto. Since the temperature variation is suppressed in the above-described manners such an optical waveguide type liquid crystal optical switch having a low crosstalk and also low insertion loss may be constituted.

(Double Gate Type Optical Switch)

Also, while an even number of the above-explained optical waveguide type liquid crystal optical switches 10 may be connected to each other, these connected optical switches may be equipped with one pair of input terminals and one pair of output terminals in a similar manner to a single optical switch. In the present invention, such a construction that an even number of waveguide type liquid crystal optical switches 10 are connected to each other, and the entire optical switches may function as a single optical switch will be defined as a "double gate type optical switch."

Figure 8:
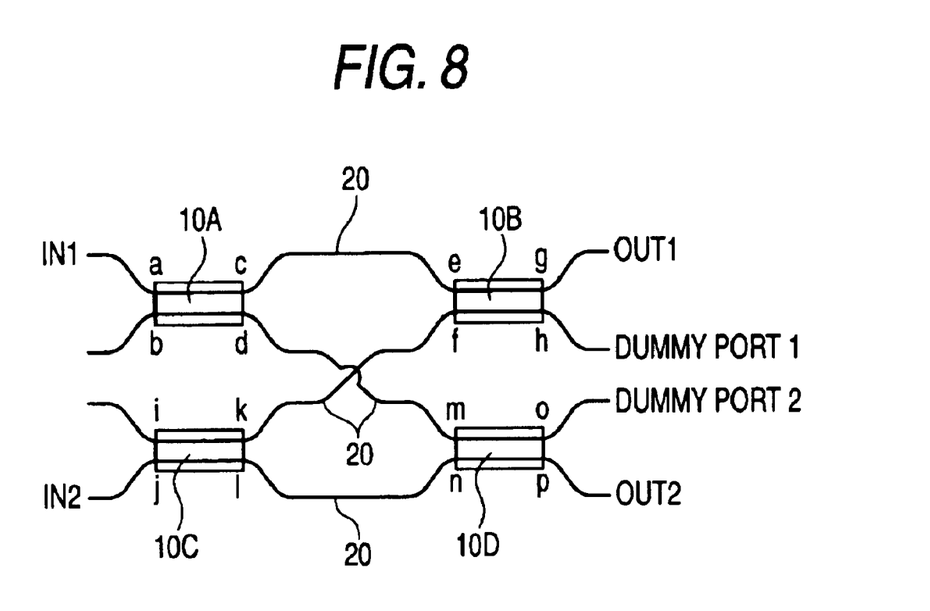
FIG. 8 is a plan view for showing a double gate type optical switch arranged by connecting four pieces of the waveguide type liquid crystal optical switches to mach other.

FIG. 8 indicates an example of such a double gate type optical switch, and schematically represents the double gate type optical switch which is arranged by four sets of the above-described waveguide type liquid crystal optical switches 10. The double gate type optical switch shown in this drawing is arranged as follows: That is to say, one output terminal "c" of a first optical waveguide-type liquid crystal optical switch 10A is connected to one input terminal "e" of a second waveguide type liquid crystal optical switch 10B by employing an optical waveguide 20; the other output terminal "d" of the first optical waveguide type liquid crystal optical switch 10A is connected to one input terminal "m" of a fourth waveguide type liquid crystal optical switch 10D by employing an optical waveguide 20; one output terminal "k" of a third optical waveguide type liquid crystal optical switch 10C is connected to the other input terminal "f" of the second waveguide type liquid crystal optical switch 10B by employing an optical waveguide 20; and the other output terminal "l" of the third optical waveguide type liquid crystal optical switch 10C is connected to the other input terminal "n" of the fourth waveguide type liquid crystal optical switch 10D by employing an optical waveguide 20. Also, one input terminal "a" of the first optical waveguide type liquid crystal optical switch 10A is terminated as a first input port (IN1); one input terminal "j" of the third optical waveguide type liquid crystal optical switch 10C is terminated as a second input port (IN2); and furthermore, one output terminal "g" of the second optical waveguide type liquid crystal optical switch 10B is terminated as a first output port (OUT1); and, the other output terminal "p" of the fourth optical waveguide type liquid crystal optical switch 10D is terminated as a second output port (OUT2). In addition thereto, the other output terminal "h" of the second optical waveguide type liquid crystal optical switch 10B is terminated as a dummy port "1", and also, the other output terminal "o" of the fourth optical waveguide type liquid crystal optical switch 10D is terminated as a dummy port "2."

Also, in this double gate type optical switch, similar to the above-described waveguide type liquid crystal optical switch (see FIGS. 3A and 3B), such a condition that an optical signal entered from the first input port IN1 is projected from the first output port OUT1, and also, an output signal entered from the second input port IN2 in projected from the second port OUT2 is assumed as an "ON state", whereas conversely, such a condition that an optical signal entered from the first input port IN1 is projected from the second output port OUT2, and also, an output signal entered from the second input port IN2 is projected from the first port OUT1 is assumed as an "OFF state". Also, under either the "ON state" or the "OFF state", a ratio of intensity of an optical signal which should be projected from each or the output ports with respect to intensity of an optical signal (namely, stray light) which should not be projected is defined as an "extinction ratio."

In the above-described double gate type switch, in order to bring this double gate type switch into the ON state, all of the waveguide type liquid crystal optical switches 10A to 10D are set to ON states. As a result, the optical signal entered from the first input port IN1 is projected from the output terminal "c" of the first waveguide type liquid crystal optical switch 10A, and then, is entered to the input terminal "e" of the second optical waveguide switch 10B, and thereafter, is projected from the output terminal "g", namely from the first output port OUT1. In this case, even when stray light is present, this stray light is projected from the output terminal "d" in the first waveguide type liquid crystal optical switch 10A and then is reached to the dummy port 2, and the stray light is reached to the dummy port 1 in the second waveguide type liquid crystal optical switch 10B, namely, this stray light is not projected from the respective original output ports thereof. As a consequence, a high extinction ratio can be realized.

On the other hand, in order to bring this double gate type optical switch into an OFF state, all of the waveguide type liquid crystal optical switches 10A to 10D may be merely set to OFF states. In this case, stray light is similarly projected from either the dummy port 1 or the dummy port 2.

Figure 9:
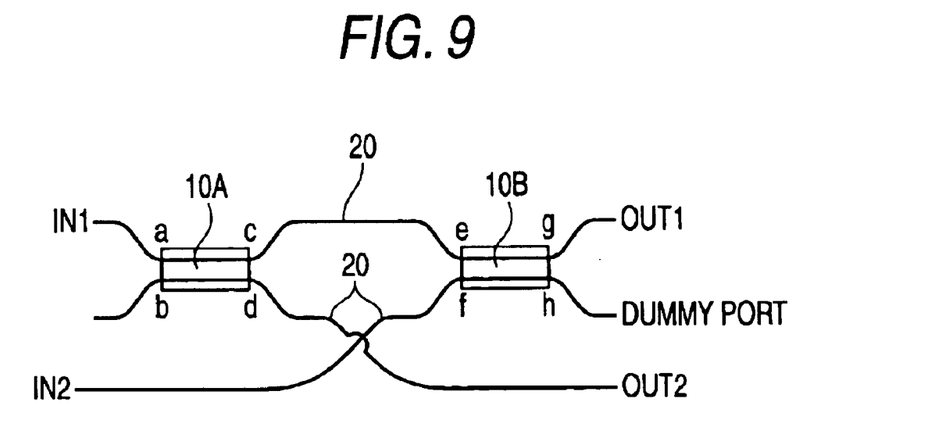
FIG. 9 is a plan view for showing a double gate type optical switch arranged by connecting two pieces of the waveguide type liquid crystal optical switches to each other.

Also, as shown in FIG. 9, while two sets of the above-described waveguide type liquid crystal optical switches 10 are connected to each other, these connected waveguide type liquid crystal optical switches may constitute a single optical switch as an entire construction. In this switch construction, one output terminal "c" of a first optical waveguide type liquid crystal optical switch 10A is connected to one input terminal "e" of a second waveguide type liquid crystal optical switch 10B by employing an optical waveguide 20. Also, in this switch construction, one input terminal "a" of the first optical waveguide type liquid crystal optical switch 10A is terminated as a first input port (IN1); the other input terminal "f" of the second optical waveguide type liquid crystal optical switch 10B is terminated as a second input port (IN2); one output terminal "g" of the second optical waveguide type liquid crystal optical switch 10B is terminated as a first output port (OUT1); and the other output terminal "d" of the first optical waveguide type liquid crystal optical switch 10A is terminated as a second output port (OUT2). Further, the other output terminal "h" of the second optical waveguide type liquid crystal optical switch 10B is terminated as a dummy port.

In the above-described double gate type switch, in order to bring this double gate type switch into the ON state, both the first waveguide type liquid crystal optical switch 10A and the second waveguide type liquid crystal optical switch 10B are set to ON states. As a result, an optical signal entered to the first input port IN1 is projected from the output terminal "c" of the first waveguide type liquid crystal optical switch 10A, and then, is entered to the input terminal "e" of the second optical waveguide type liquid crystal optical switch 10B, and thereafter, is projected from the output terminal "g", namely from the first output port OUT1. In this case, when stray light is present, this stray light is reached to the other output terminal "d" of the first waveguide type liquid crystal optical switch 10A and then is projected from the second output port OUT2. As a consequence, an extinction ratio of this double gate type optical switch may become the same as that of a single waveguide type liquid crystal optical switch.

On the other hand, in order to bring this double gate type optical switch into an OFF state, both the first waveguide type liquid crystal optical switch 10A and the second waveguide type liquid crystal optical switch 10B are set to OFF states. As a result, any one of stray light as to the optical signals which are entered into the first input port IN1 and the second input port IN2 is outputted from the dummy port 2.

As previously explained, in the double gate type optical switch constituted by two sets of the waveguide type liquid crystal optical switches 10A and 10B, a total number of these waveguide type liquid crystal optical switches is small and thus, this double gate type optical switch may be made in low cost. However, since a light signal cannot be outputted from the second input port IN2 to the second output port OUT2, this double gate type optical switch is required to be arranged in such a manner that the second output port OUT2 is not used under ON state.

It should also be noted that the above-described double gate type optical switches may be preferably constructed as follows. That is, all of the waveguide type liquid crystal optical switches may be preferably connected to each other by employing the optical waveguides and then are integrated on the same substrate. Alternatively, waveguide type liquid crystal optical switches which have been separately formed may be connected to each other by employing optical fibers so as to construct such double gate type optical switches.

As previously described in detail, in accordance with the present invention, the high-performance waveguide type liquid crystal optical switches having no polarized-wave dependent characteristic and operable under low insertion loss can be provided, so compared with the conventional optical waveguide type optical switch.

What is claimed is:

1. A waveguide type liquid crystal optical switch in which optical waveguide formed by cores, comprising:
   a pair of a first core and a second core, in which light is input from one of the first core and the second core and an optical path is switched between the first and second cores, and the first core and the second core being provided so as to form a space therebetween;
   a third core provided apart from the first core and the second core at predetermined distances, into which nematic liquid crystal orientated by an orientation film along a predetermined direction is filled, the third core overlapping to the space formed between the first core and the second core;
   a first electrode arranged on an opposite side of the first core and the second core with respect to the third core in such a manner that the first electrode is overlapped to the space between the first core and the second core;
   a second electrode and a third electrode, which are arranged on both sides of the first electrode so as to constitute a pair, and which cause liquid crystal molecules to be orientated along a direction perpendicular to the orientation direction of the orientation film; and
   a cladding for incorporating the first core, the second core, the third core, and the first to third electrodes.

2. A waveguide type liquid crystal optical switch as claimed in claim 1, wherein a refractive index of the third core with respect to either TE polarized light or TM polarized light is changeable to thereby switch the optical path between the first core and the second core.

3. A waveguide type liquid crystal optical switch as claimed in claim 1, wherein the first and second cores are coupled in a mode coupling where a light intensity of one of the first and second cores to which the light is input and a light intensity of the third core have minimal values and a light intensity of another core to which the light is not input has a maximum value at intermediate positions along respective optical axis directions under a condition that a refractive index of the third core is set to a higher value.

4. A waveguide type liquid crystal optical switch as claimed in claim 1, wherein the first and second cores are coupled in a mode coupling where a light intensity of one of the first and second cores to which the light is input has a minimal value and a light intensity of another core to which the light is not input and a light intensity of the third core have maximum values at intermediate positions along respective optical axis directions under a condition that a refractive index of the third core is set to a higher value.

5. A waveguide type liquid crystal optical switch as claimed in claim 1, wherein a cladding is defined as a first cladding which surrounds both the first core and the second core, and a second cladding which surrounds the third core and the first to third electrodes; and a refractive index of the first cladding is made higher than a refractive index of the second cladding.

6. A waveguide type liquid crystal optical switch as claimed in claim 1, further comprising:
   a temperature control unit for maintaining a temperature of an optical waveguide at a constant temperature.

7. A waveguide type liquid crystal optical switch as claimed in claim 6, wherein the temperature control unit is integrated with the waveguide type liquid crystal optical switch, and is thermally insulated from a surrounding environment thereof.

8. A double gate type optical switch comprising two pieces, or four pieces of the waveguide type liquid crystal optical switch recited in claim 1, wherein an output terminal of one waveguide type liquid crystal optical switch is connected to an input terminal of another waveguide type liquid crystal optical switch by way of either an optical guide path or an optical fiber; and the double gate type optical switch is provided with two input terminals, two output terminals, and either one or two dummy output terminals.

* * * * *